United States Patent
Baharav et al.

(10) Patent No.: US 7,333,055 B2
(45) Date of Patent: Feb. 19, 2008

(54) SYSTEM AND METHOD FOR MICROWAVE IMAGING USING AN INTERLEAVED PATTERN IN A PROGRAMMABLE REFLECTOR ARRAY

(75) Inventors: Izhak Baharav, Palo Alto, CA (US); Robert C. Taber, Palo Alto, CA (US); Gregory S. Lee, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 188 days.

(21) Appl. No.: 11/088,610

(22) Filed: Mar. 24, 2005

(65) Prior Publication Data

US 2006/0214833 A1  Sep. 28, 2006

(51) Int. Cl.
*H01Q 15/14* (2006.01)
*H01Q 3/38* (2006.01)

(52) U.S. Cl. .................. 342/376; 342/5; 342/179

(58) Field of Classification Search ........... 342/176, 342/179, 180, 170–174, 146–149, 153–158, 342/368, 371–377, 6, 5
See application file for complete search history.

(56) References Cited

U.S. PATENT DOCUMENTS

| | | | | |
|---|---|---|---|---|
| 3,526,898 A | * | 9/1970 | Plunk et al. | 343/771 |
| 3,706,998 A | * | 12/1972 | Hatcher et al. | 343/754 |
| 3,842,417 A | * | 10/1974 | Williams | 342/158 |
| 3,842,421 A | * | 10/1974 | Rootsey et al. | 343/909 |
| 4,045,800 A | * | 8/1977 | Tang et al. | 342/372 |
| 4,336,540 A | * | 6/1982 | Goodwin et al. | 342/157 |
| 4,502,025 A | | 2/1985 | Carl, Jr. et al. | |
| 4,649,393 A | | 3/1987 | Rittenbach | |
| 4,689,627 A | | 8/1987 | Lee et al. | |
| 4,885,592 A | | 12/1989 | Kofol et al. | |
| 5,027,125 A | | 6/1991 | Tang | |
| 5,063,529 A | * | 11/1991 | Chapoton | 702/106 |
| 5,170,170 A | | 12/1992 | Soumekh | |
| 5,365,237 A | | 11/1994 | Johnson et al. | |
| 5,734,349 A | * | 3/1998 | Lenormand et al. | 342/373 |
| 5,859,616 A | * | 1/1999 | Gans et al. | 343/700 MS |

(Continued)

FOREIGN PATENT DOCUMENTS

GB  2236446  4/1991

(Continued)

OTHER PUBLICATIONS

Haupt, Randy L. Interleaved Thinned Linear Arrays. Sep. 2005. IEEE Transactions on Antennas and Propagation, vol. 53, No. 9, pp. 2858-2864.*

(Continued)

*Primary Examiner*—Thomas H. Tarcza
*Assistant Examiner*—Shelley Chen (57) ABSTRACT

An antenna array for use within a microwave imaging system includes a plurality of reflecting antenna elements, each capable of being programmed with respective phase-shifts in a first pattern to direct a first beam of microwave radiation towards a first target, and each being capable of being programmed with respective phase-shifts in a second pattern to direct a second beam of microwave radiation towards a second target. To capture a microwave image of an object, the antenna elements are programmed with respective phase-shifts in an interleaved pattern including a portion of the first pattern and a portion of the second pattern.

9 Claims, 7 Drawing Sheets

U.S. PATENT DOCUMENTS

| | | | |
|---|---|---|---|
| 5,940,030 A | 8/1999 | Hampel et al. | |
| 5,940,045 A | 8/1999 | Belcher et al. | |
| 5,969,661 A * | 10/1999 | Benjamin | 342/22 |
| 5,982,326 A | 11/1999 | Chow et al. | |
| 5,986,590 A | 11/1999 | Smith et al. | |
| 6,037,908 A | 3/2000 | Phillips et al. | |
| 6,043,786 A | 3/2000 | Vannatta et al. | |
| 6,057,761 A | 5/2000 | Yukl | |
| 6,100,843 A * | 8/2000 | Proctor et al. | 342/368 |
| 6,169,513 B1 | 1/2001 | Cohen | |
| 6,242,740 B1 | 6/2001 | Luukanen et al. | |
| 6,353,224 B1 | 3/2002 | Sinclair et al. | |
| 6,388,631 B1 * | 5/2002 | Livingston et al. | 343/767 |
| 6,501,414 B2 | 12/2002 | Arndt et al. | |
| 6,518,920 B2 * | 2/2003 | Proctor et al. | 342/367 |
| 6,549,166 B2 | 4/2003 | Bhattacharyya et al. | |
| 6,583,760 B2 * | 6/2003 | Martek et al. | 342/373 |
| 6,642,889 B1 | 11/2003 | McGrath | |
| 6,792,290 B2 * | 9/2004 | Proctor et al. | 455/562.1 |
| 6,900,775 B2 * | 5/2005 | Shapira | 343/844 |
| 6,965,340 B1 | 11/2005 | Baharav et al. | 342/22 |
| 6,965,349 B2 * | 11/2005 | Livingston et al. | 343/767 |
| 6,970,133 B2 * | 11/2005 | Chandler | 343/700 MS |
| 2002/0021246 A1 * | 2/2002 | Martek et al. | 342/373 |
| 2002/0171601 A1 * | 11/2002 | Puente Baliarda | 343/893 |
| 2003/0034916 A1 | 2/2003 | Kwon et al. | |
| 2004/0056790 A1 | 3/2004 | Lovberg et al. | |
| 2004/0061644 A1 * | 4/2004 | Lier et al. | 342/368 |
| 2004/0080448 A1 | 4/2004 | Lovberg et al. | |
| 2005/0110683 A1 * | 5/2005 | Song et al. | 343/700 MS |
| 2006/0214832 A1 * | 9/2006 | Lee et al. | 342/22 |
| 2006/0214833 A1 * | 9/2006 | Baharav et al. | 342/22 |
| 2006/0214834 A1 * | 9/2006 | Baharav et al. | 342/22 |
| 2006/0214836 A1 * | 9/2006 | Baharav et al. | 342/22 |

FOREIGN PATENT DOCUMENTS

| | | |
|---|---|---|
| GB | 2313969 | 12/1997 |

OTHER PUBLICATIONS

David M. Sheen et al.; "Three-Dimensional Millimeter-Wave Imaging for Concealed Weapon Detection"; IEEE Transactions On Microwave Theory and Techniques, vol. 49, No. 9, Sep. 2001, pp. 1581-1592.

P.F. Goldsmith, et al.; "Focal Plane Imaging Systems for Millimeter Wavelengths"; IEEE Transactions on Microwave Theory and Techniques, vol. 41, No. 10, Oct. 1993, pp. 1664-1675.

Tatsuo Nozokido, et al.; "Scanning Near-Field Millimeter-Wave Microscopy Using a Metal Slit as a Scanning Probe"; IEEE Transactions On Microwave Theory And Techniques, vol. 49, No. 3, Mar. 2001, pp. 491-499.

GB Search Report Under Section 17 dated May 11, 2006.
GB Search Report Under Section 17 dated May 25, 2006.

* cited by examiner

SYSTEM AND METHOD FOR MICROWAVE IMAGING USING AN INTERLEAVED PATTERN IN A PROGRAMMABLE REFLECTOR ARRAY

This application is related by subject matter to U.S. application for patent Ser. No. 10/997,442, entitled "A Device for Reflecting Electromagnetic Radiation," issued as U.S. Pat. No. 7,224,314; U.S. application for patent Ser. No. 10/997,583, entitled "Broadband Binary Phased Antenna," and U.S. application for patent Ser. No. 11/148,079, entitled "System and Method for Security Inspection Using Microwave Imaging" all of which were filed on Nov. 24, 2004.

This application is further related by subject matter to U.S. application for patent Ser. No. 11/088,536, entitled "System and Method for Efficient, High-Resolution Microwave Imaging Using Complementary Transmit and Receive Beam Patterns," U.S. application for patent Ser. No. 11/088,831, entitled "System and Method for Inspecting Transportable Items Using Microwave Imaging," issued as U.S. Pat. No. 7,183,963; U.S. application for patent Ser. No. 11/089,298, entitled "System and Method for Pattern Design in Microwave Programmable Arrays" and U.S. application for patent Ser. No. 11/088,830, entitled "System and Method for Minimizing Background Noise in a Microwave Image Using a Programmable Reflector Array" all of which were filed on even date herewith.

BACKGROUND OF THE INVENTION

Recent advances in microwave imaging have enabled commercial development of microwave imaging systems that are capable of generating two-dimensional and even three-dimensional microwave images of objects and other items of interest (e.g., human subjects). At present, there are several microwave imaging techniques available. For example, one technique uses an array of microwave detectors (hereinafter referred to as "antenna elements") to capture either passive microwave radiation emitted by the person or other object or reflected microwave radiation reflected from the person or other object in response to active microwave illumination of the target. A two-dimensional or three-dimensional image of the person or other object is constructed by scanning the array of antenna elements with respect to the object's position and/or adjusting the frequency (or wavelength) of the microwave radiation being transmitted or detected.

Microwave imaging systems typically include transmit, receive and/or reflect antenna arrays for transmitting, receiving and/or reflecting microwave radiation to/from the object. Such antenna arrays can be constructed using traditional analog phased arrays or binary reflector arrays. In either case, the antenna array typically directs a beam of microwave radiation containing a number of individual microwave rays towards a point or area/volume in 3D space, hereinafter referred to as a target. The target can be associated with the object and correspond to a voxel or a plurality of voxels in an image of the object or the target can be a microwave receiver for capturing microwave radiation reflected off the object. This is accomplished by programming each of the antenna elements in the array with a respective phase-shift that allows the antenna element to modify the phase of a respective one of the microwave rays. The phase-shift of each antenna element is selected to cause all of the individual microwave rays from each of the antenna elements to arrive at the target substantially in-phase. Examples of programmable antenna arrays are described in U.S. patent application Ser. No. 10/997,442, entitled "A Device for Reflecting Electromagnetic Radiation," issued as U.S. Pat. No. 7,224,314; and patent application Ser. No. 10/997,583, entitled "Broadband Binary Phased Antenna."

As a result, for each target, each antenna element is programmed with a particular phase-shift to produce a beam of microwave radiation that experiences the highest constructive interference at the target. The combination of all the phase-shifts assigned to the antenna elements in the array for a particular target is referred to as a pattern. The size of the pattern is the same size as the array, and each element in the pattern represents the phase-shift of a corresponding antenna element in the array. In the case of a binary array, where each antenna element can introduce only one of two phase-shifts, the pattern can be represented as an array of ones and zeros.

When using reflector antenna arrays that are designed to both reflect microwave radiation from a microwave source to a target associated with the object and reflect microwave radiation reflected from the object target to a microwave receiver target, the patterns for each reflection (to the object-target and to the receiver-target) may contain conflicting values. For example, a particular antenna element in the reflector array may have a 0 degree phase-shift in a transmit design to reflect the microwave radiation from the microwave source to the object-target and a 180 degree phase-shift in a receive design to reflect the microwave radiation from the object-target to the microwave receiver-target.

To capture a microwave image of the target-object, substantially simultaneous reflection between the microwave source and the microwave receiver is required. Therefore, in order to use a single reflector antenna array for both transmission and reception of the microwave radiation, each antenna element can be programmed with only one phase-shift value. If the two phase-shift values for a particular antenna element in the transmit and receive patterns contradict each other, only one of the phase-shift values can be used for that particular antenna element during image capture. What is needed is a method to determine the phase-shift value for each antenna element when incorporating two patterns (transmit and receive) onto the array.

SUMMARY OF THE INVENTION

Embodiments of the present invention provide an antenna array for use within a microwave imaging system including a plurality of reflecting antenna elements, each capable of being programmed with respective phase-shifts in a first pattern to direct a first beam of microwave radiation towards a first target, and each being capable of being programmed with respective phase-shifts in a second pattern to direct a second beam of microwave radiation towards a second target. To capture a microwave image of an object, the antenna elements are programmed with respective phase-shifts in an interleaved pattern including a portion of the first pattern and a portion of the second pattern.

In one embodiment, the interleaved pattern is a direct interleaved pattern of the first pattern and the second pattern. In another embodiment, the interleaved pattern includes portions of the first and second patterns that minimize the quantization error of the array. In both the first pattern and the second pattern, the phase-shifts of each of the plurality of antenna elements are selected based on an ideal phase. To minimize the quantization error, the portions of the first and second patterns that are included in the interleaved pattern produce the lowest phase offset from the ideal phase for each of the antenna elements.

In yet another embodiment, the portions of the first and second patterns included in the interleaved pattern are selected to minimize the number of phase-shift changes in the array between successive microwave images, and thus reduce the power consumption. In still another embodiment, the portions of the first and second patterns included in the interleaved pattern are selected to optimize a metric associated with the digital compression of the interleaved pattern description in bits, which allows for a smaller storage space and faster handling of the pattern data.

In a further embodiment, both the first target and the second target are associated with the object being imaged. In another embodiment, the first target is a target associated with the object being imaged and the second target is a microwave receiver. To capture a microwave image of the target, the first pattern is a transmit pattern for directing a transmit beam of microwave radiation towards the target and the second pattern is a receive pattern for reflecting a receive beam of microwave radiation reflected from the target towards the microwave receiver. In still a further embodiment, the interleaved pattern includes portions of the transmit and receive patterns that increases the destructive interference at the microwave receiver without a corresponding decrease in the constructive interference at the target.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

As used herein, the terms microwave radiation and microwave illumination each refer to the band of electromagnetic radiation having wavelengths between 0.3 mm and 30 cm, corresponding to frequencies of about 1 GHz to about 1,000 GHz. Thus, the terms microwave radiation and microwave illumination each include traditional microwave radiation, as well as what is commonly known as millimeter-wave radiation. In addition, as used herein, the term target refers to a point or area/volume in 3D space. In one embodiment, the target is associated with the object and correspond sto a voxel or a plurality of voxels in an image of an object. In another embodiment, the target is a microwave receiver for capturing microwave radiation reflected off the object being imaged.

Figure 1:
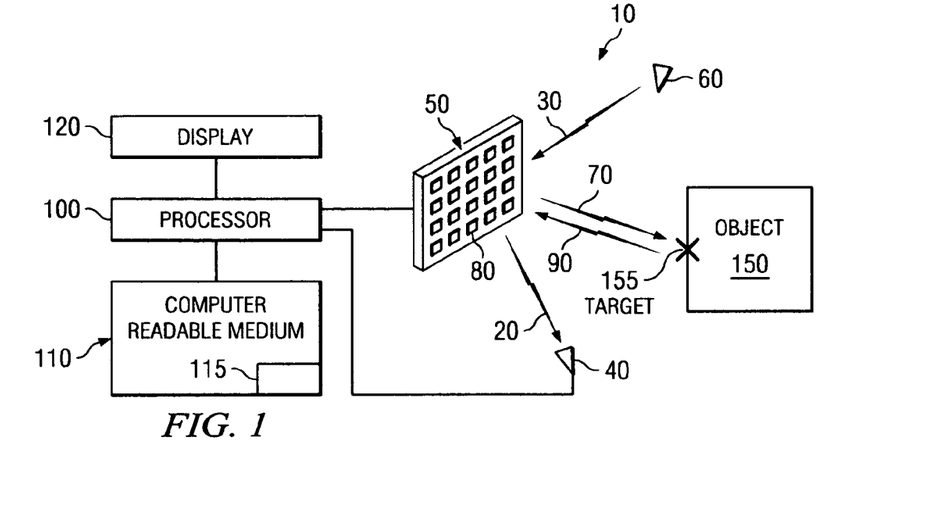
FIG. 1 is a schematic diagram of a simplified exemplary microwave imaging system including a programmable antenna array in accordance with embodiments of the present invention.

FIG. 1 is a schematic diagram of a simplified exemplary microwave imaging system 10, in accordance with embodiments of the present invention. The microwave imaging system 10 includes a one or more arrays 50 (only one of which is shown for convenience), each capable of transmitting, receiving and/or reflecting microwave radiation via antenna elements 80 to capture a microwave image of an object 150 (e.g., suitcase, human subject or any other item of interest).

In one embodiment, the array 50 includes a passive programmable reflector array composed of reflecting antenna elements 80. Each of the reflecting antenna elements is capable of being programmed with a respective phase-shift to direct a beam of microwave radiation towards a target 155 (e.g., a point or area/volume in 3D space corresponding to a voxel or a plurality of voxels in an image of the object 150) on the object 150 being imaged. The phase-shift can be either binary or continuous. For example, microwave radiation 30 received by the array 50 from a microwave source 60 is reflected towards the target 155 on the object 150 as transmit microwave radiation 70, and reflected microwave radiation 90 reflected from the target 155 and received by the array 50 is reflected towards another target 40 (e.g., a microwave receiver 40) as receive microwave radiation 20 by programming each of the individual reflecting antenna elements 80 with a respective phase-shift.

The microwave imaging system 10 further includes a processor 100, computer-readable medium 110 and a display 120. The processor 100 includes any hardware, software, firmware, or combination thereof for controlling the array 50 and processing the received microwave radiation 20 reflected from the target 155 to construct a microwave image of the target 155 and/or object 150. For example, the processor 100 may include one or more microprocessors, microcontrollers, programmable logic devices, digital signal processors or other type of processing devices that are configured to execute instructions of a computer program, and one or more memories (e.g., cache memory) that store the instructions and other data used by the processor 100. However, it should be understood that other embodiments of the processor 100 may be used. The memory 110 is any type of data storage device, including but not limited to, a hard drive, random access memory (RAM), read only memory (ROM), compact disc, floppy disc, ZIP® drive, tape drive, database or other type of storage device or storage medium.

The processor 100 operates to program the array 50 using one or more patterns 115 stored in the computer-readable medium 110. Each pattern 115 contains the phase-shifts of each of the individual antenna elements 80 in the array 50 to reflect microwave radiation from the microwave source 60 towards a particular target 155 on the object 150 and reflect reflected microwave radiation from the target 155 towards the microwave receiver 40. Thus, the processor 100 in conjunction with the patterns 115 and the array 50 operates to scan the object 150.

The processor 100 is further capable of constructing a microwave image of the object 150 using the intensity of the reflected microwave radiation 20 captured by the microwave receiver 40 from each target 155 on the object 150. For example, in one embodiment, the microwave receiver 40 is capable of combining the reflected microwave radiation 20 reflected from each antenna element 80 in the array 50 to produce a value of the effective intensity of the reflected microwave radiation at the target 155. The intensity value is passed to the processor 100, which uses the intensity value as the value of a pixel or voxel corresponding to the target 155 on the object 150. In operation, the microwave imaging system 10 can operate at frequencies that enable millions of targets 155 to be scanned per second.

The resulting microwave image of the target 155 and/or object 150 can be passed from the processor 100 to the display 120 to display the microwave image. In one embodiment, the display 120 is a two-dimensional display for displaying a three-dimensional microwave image of the object 150 or one or more one-dimensional or two-dimensional microwave images of the target 155 and/or object 150. In another embodiment, the display 120 is a three-dimensional display capable of displaying a three-dimensional microwave image of the object 150.

Figure 2:
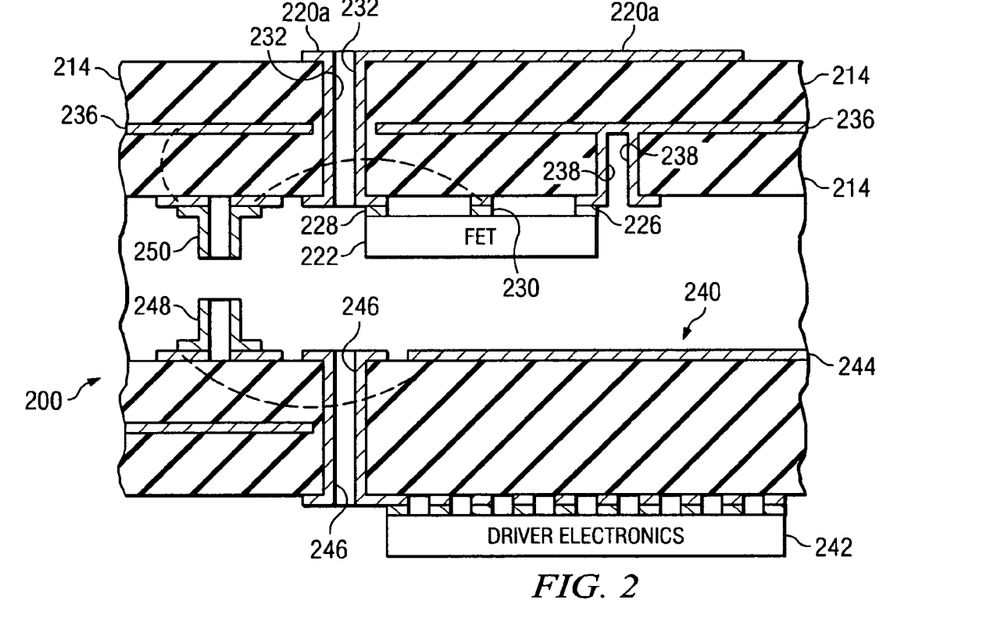
FIG. 2 is a cross-sectional view of a passive antenna element for use in a reflector array, in accordance with embodiments of the present invention.

FIG. 2 illustrates a cross-sectional view of a reflecting antenna element 200 (corresponding to antenna element 80 in FIG. 1) that operates to reflect electromagnetic radiation with varying phase depending on the impedance state of the antenna element 200. The reflecting antenna element 200 includes an antenna (patch antenna 220a) and a non-ideal switching device (surface mounted field effect transistor "FET" 222).

The reflecting antenna element 200 is formed on and in a printed circuit board substrate 214 and includes the surface mounted FET 222, the patch antenna 220a, a drain via 232, a ground plane 236 and a source via 238. The surface mounted FET 222 is mounted on the opposite side of the printed circuit board substrate 214 as the planar patch antenna 220a and the ground plane 236 is located between the planar patch antenna 220a and the surface mounted FET 222. The drain via 232 connects the drain 228 of the surface mounted FET 222 to the planar patch antenna 220a and the source via 238 connects the source 226 of the surface mounted FET 222 to the ground plane 236.

In a working product, the reflector antenna array is connected to a controller board 240 that includes driver electronics. An example controller board 240 is also depicted in FIG. 2 and includes a ground plane 244, a drive signal via 246, and driver electronics 242. The controller board 240 also includes connectors 248 that are compatible with connectors 250 of the reflector antenna array. The connectors 248 and 250 of the two boards can be connected to each other, for example, using wave soldering. It should be understood that in other embodiments, the FET 222 can be surface mounted on the same side of the printed circuit board substrate 214 as the planar patch antenna 220a Additionally, the driver electronics 242 can be soldered directly to the same printed circuit board in which the reflecting antenna element 200 is built.

The patch antenna element 220a functions to reflect with more or less phase-shift depending on the impedance level of the reflecting antenna element 200. The reflecting antenna element 200 has an impedance characteristic that is a function of the antenna design parameters. Design parameters of antennas include but are not limited to, physical attributes such as the dielectric material of construction, the thickness of the dielectric material, shape of the antenna, length and width of the antenna, feed location, and thickness of the antenna metal layer.

The FET 230 (non-ideal switching device) changes the impedance state of the reflecting antenna element 200 by changing its resistive state. A low resistive state (e.g., a closed or "short" circuit) translates to a low impedance. Conversely, a high resistive state (e.g., an open circuit) translates to a high impedance. A switching device with ideal performance characteristics (referred to herein as an "ideal" switching device) produces effectively zero impedance (Z=0) when its resistance is at its lowest state and effectively infinite impedance (Z=∞) when its resistance is at its highest state. As described herein, a switching device is "on" when its impedance is at its lowest state (e.g., $Z_{on}=0$) and "off" when its impedance is at its highest state (e.g., $Z_{off}=\infty$). Because the on and off impedance states of an ideal switching device are effectively $Z_{off}=0$ and $Z_{off}=\infty$, an ideal switching device is able to provide the maximum phase-shift without absorption of electromagnetic radiation between the on and off states. That is, the ideal switching device is able to provide switching between 0 and 180 degree phase states. In the case of an ideal switching device, maximum phase-amplitude performance can be achieved with an antenna that exhibits any finite non-zero impedance.

In contrast to an ideal switching device, a "non-ideal" switching device is a switching device that does not exhibit on and off impedance states of $Z_{on}=0$ and $Z_{off}=\infty$, respectively. Rather, the on and off impedance states of a non-ideal switching device are typically, for example, somewhere between $0<|Z_{on}|<|Z_{off}|<\infty$. However, in some applications, the on and off impedance states may even be $|Z_{off}|<=|Z_{on}|$. A non-ideal switching device may exhibit ideal impedance characteristics within certain frequency ranges (e.g., <10 GHz) and highly non-ideal impedance characteristics at other frequency ranges (e.g., >20 GHz).

Because the on and off impedance states of a non-ideal switching device are somewhere between $Z_{on}=0$ and $Z_{off}=\infty$, the non-ideal switching device does not necessarily provide the maximum phase state performance regardless of the impedance of the corresponding antenna, where maximum phase state performance involves switching between 0 and 180 degree phase states. In accordance with the invention, the reflecting antenna element 200 of FIG. 2 is specifically designed to provide optimal phase performance, where the optimal phase state performance of a reflecting antenna element is the point at which the reflecting element is closest to switching between 0 and 180 degree phase-amplitude states. In an embodiment, to achieve optimal phase state performance, the antenna element 200 is configured as a function of the impedance of the non-ideal switching device (FET 230). For example, the antenna element 200 is designed such that the impedance of the antenna element 200 is a function of impedance characteristics of the FET 230.

Further, the antenna element 200 is configured as a function of the impedance of the non-ideal switching device (FET 230) in the on state, $Z_{on}$, and the impedance of the non-ideal switching device 230 in the off state, $Z_{off}$. In a particular embodiment, the phase state performance of the reflecting antenna element 200 is optimized when the antenna element 200 is configured such that the impedance of the antenna element 200 is conjugate to the square root of the impedance of the non-ideal switching device 230 when in the on and off impedance states, $Z_{on}$ and $Z_{off}$. Specifically, the impedance of the antenna element 200 is the complex conjugate of the geometric mean of the on and off impedance states, $Z_{on}$ and $Z_{off}$, of the corresponding non-ideal switching device 230. This relationship is represented as:

$$Z_{antenna}^* = \sqrt{Z_{on} Z_{off}} \qquad (1)$$

where ( )* denotes a complex conjugate. The above-described relationship is derived using the well-known formula for the complex reflection coefficient between a source impedance and a load impedance. Choosing the source to be the antenna element 200 and the load to be the non-ideal switching device 230, the on-state reflection coefficient is set to be equal to the opposite of the off-state reflection coefficient to arrive at equation (1).

Designing the antenna element 200 to exhibit optimal phase-amplitude performance involves determining the on and off impedances, $Z_{on}$ and $Z_{off}$ of the particular non-ideal switching device that is used in the reflecting antenna element 200 (in this case, FET 230). Design parameters of the antenna element 200 are then manipulated to produce an antenna element 200 with an impedance that matches the relationship expressed in equation (1) above. An antenna element 200 that satisfies equation (1) can be designed as long as $Z_{on}$ and $Z_{off}$ are determined to be distinct values.

Another type of switching device, other than the surface mounted FET 230 shown in FIG. 2, that exhibits non-ideal impedance characteristics over the frequency band of interest is a surface mount diode. However, although surface mounted diodes exhibit improved impedance characteristics over the frequency band of interest compared to surface mounted FETs, surface mounted FETs are relatively inexpensive and can be individually packaged for use in reflector antenna array applications.

In a reflector antenna array that utilizes FETs as the non-ideal switching devices, the beam-scanning speed that can be achieved depends on a number of factors including signal-to-noise ratio, crosstalk, and switching time. In the case of a FET, the switching time depends on gate capacitance, drain-source capacitance, and channel resistance (i.e., drain-source resistance). The channel resistance is actually space-dependent as well as time-dependent. In order to minimize the switching time between impedance states, the drain of the FET is preferably DC-shorted at all times. The drain is preferably DC-shorted at all times because floating the drain presents a large off-state channel resistance as well as a large drain-source capacitance due to the huge parallel-plate area of the patch antenna. This implies that the antenna is preferably DC-shorted but one wishes the only "rf short" the antenna sees be at the source. Therefore, the additional antenna/drain short must be optimally located so as to minimally perturb the antenna.

It should be understood that other types of antennas can be used in the reflecting antenna element 200, instead of the patch antenna 220a. By way of example, but not limitation, other antenna types include dipole, monopole, loop, and dielectric resonator type antennas. In addition, in other embodiments, the reflecting antenna element 200 can be a continuous phase-shifted antenna element 200 by replacing the FETs 230 with variable capacitors (e.g., Barium Strontium Titanate (BST) capacitors). With the variable capacitor loaded patches, continuous phase-shifting can be achieved for each antenna element 200, instead of the binary phase-shifting produced by the FET loaded patches. Continuous phased arrays can be adjusted to provide any desired phase-shift in order to steer a microwave beam towards any direction in a beam scanning pattern.

Figure 3:
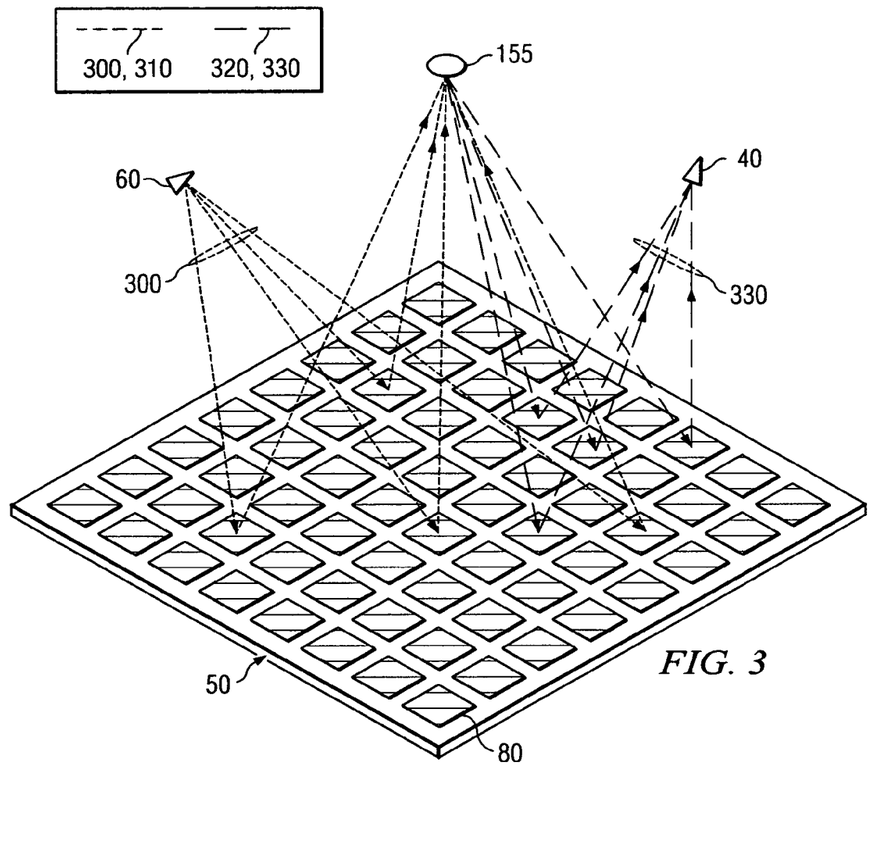
FIG. 3 is a schematic diagram of a top view of an exemplary reflector array incorporating reflecting antenna elements for reflecting microwave radiation, in accordance with embodiments of the present invention.

FIG. 3 is a schematic diagram of a top view of an exemplary array 50 for reflecting microwave radiation, in accordance with embodiments of the present invention. In FIG. 3, a source beam 300 of microwave radiation transmitted from a microwave source 60 is received by various antenna elements 80 in the array 50. The microwave source 60 can be any source sufficient for illuminating the array 50, including, but not limited to, a point source, a horn antenna or any other type of antenna. The antenna elements 80 within the array 50 are each programmed with a respective phase-shift to direct a transmit beam 310 of reflected microwave radiation towards a target 155. The phase-shifts are selected to create positive (constructive) interference between all of the microwave rays within the beam of reflected microwave radiation 310 at the target 155. Ideally, the phase-shift of each of the antenna elements 80 is adjusted to provide the same phase delay for each microwave ray of the reflected microwave radiation 310 from the source (antenna elements 80) to the target 155.

In a similar manner, as shown in FIG. 3, a reflect beam 320 of microwave radiation reflected from the target 155 and received at the array 50 can be reflected as a receive beam 330 of reflected microwave radiation towards a microwave receiver 40. Again, the phase-shifts are selected to create positive (constructive) interference between all of the microwave rays within the beam of reflected microwave radiation 330 at the microwave receiver 40. Although the microwave receiver 40 is shown at a different spatial location than the microwave source 60, it should be understood that in other embodiments, the microwave source 60 can be positioned in the same spatial location as the microwave receiver 40 as a separate antenna or as part of the microwave receiver 40 (e.g., a confocal imaging system).

Figure 4A:
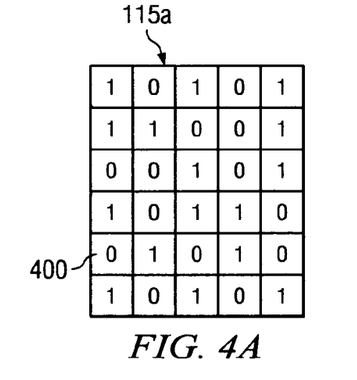
FIGS. 4A and 4B are exemplary portions of transmit and receive phase-shift patterns for programming a reflector array.
Figure 4B:
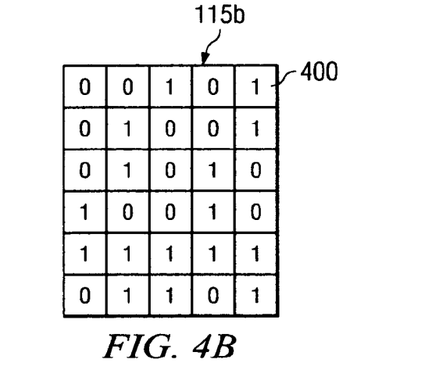

FIGS. 4A and 4B illustrate exemplary phase-shift patterns for programming the reflecting antenna elements in the array. FIG. 4A illustrates a transmit pattern 115a of phase-shifts for reflecting the microwave radiation from the microwave source to the target, and FIG. 4B illustrates a receive pattern 115b of phase-shifts for reflecting the microwave radiation from the target to the microwave receiver. The size of each pattern 115a and 115b is the same size as the array, and each element (box) in each pattern includes the phase-shift 400 of a corresponding antenna element in the array. For simplicity, the patterns in FIGS. 4A and 4B are binary patterns of ones and zeros. However, it should be understood that embodiments of the present invention are equally applicable to other types of quantized arrays and continuously-variable arrays.

Each box in pattern 115a has a corresponding box in pattern 115b, both of which are associated with the same antenna element in the array. For example, the top left corner box in FIG. 4A corresponds to the same antenna element as the top left corner box in FIG. 4B. As can be seen in FIGS. 4A and 4B, the phase-shift 400 in the top left corner box in FIG. 4A is different than the phase-shift 400 in the top left corner box in FIG. 4B. Thus, the phase-shift for the antenna element corresponding to the top left corner box in the transmit pattern 115a is different from the phase-shift for the same antenna element in the receive pattern 115b. Similar phase-shift conflicts can be found throughout the patterns 115a and 115b in FIGS. 4A and 4B.

However, in order to use a single reflector antenna array for both reflecting the microwave radiation from the microwave source to the target and reflecting the microwave radiation from the target to the microwave receiver to capture a microwave image of the target, each antenna element can be programmed with only one phase-shift value during the entire image capture process. If the two phase-shift values for a particular antenna element (e.g., the antenna element corresponding to the top left corner box) in the transmit and receive patterns 115a and 115b contradict each other, only one of the phase-shift values from either the transmit pattern 115a or the receive pattern 115b can be used for that particular antenna element during image capture.

In accordance with embodiments of the present invention, to avoid phase-shift conflicts between transmit and receive patterns, portions of the transmit pattern can be interleaved with portions of the receive pattern, such that each antenna element in the array is programmed to either reflect microwave radiation from the microwave source to the target or reflect microwave radiation from the target to the microwave receiver. Although there is a reduction in resolution in the interleaved pattern design as compared with the original transmit and receive pattern designs by a small factor, the addressable field-of-view (AFOV) on the object is unchanged between the transmit and receive patterns and the interleaved pattern because the overall pattern array coverage is the same.

It should be understood that in other embodiments, the interleaved pattern can be formed of two or more transmit patterns and/or two or more receive patterns. For example, if multiple microwave sources are used to illuminate the reflector array, and each microwave source requires a different pattern on the array, the reflector array can be programmed with an interleaved pattern of multiple transmit patterns. Likewise, if the reflector array reflects microwave radiation towards multiple microwave receivers, and each microwave receiver requires a different pattern on the array, the reflector array can be programmed with an interleaved pattern of multiple receive patterns.

Figure 5:
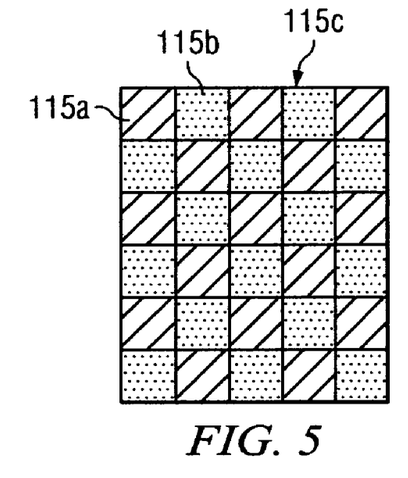
FIG. 5 illustrates an exemplary interleaved pattern directly interleaving the transmit and receive phase-shift patterns for programming a reflector array, in accordance with embodiments of the present invention

FIG. 5 illustrates one example of an interleaved pattern 115c including portions of the transmit pattern 115a and the receive pattern 115b. In FIG. 5, the transmit pattern 115a is represented as diagonal striped boxes, while the receive pattern 115b is represented as dotted boxes. Each box in pattern 115c has a corresponding box in patterns 115a and 115b, shown in FIGS. 4A and 4B, all of which are associated with the same antenna element in the array. For example, the top left corner box in FIG. 4A corresponds to the same antenna element as the top left corner box in FIG. 4B and the same antenna element as the top left corner box in FIG. 5.

The interleaved pattern 115c shown in FIG. 5 alternates between phase-shift values from the transmit pattern 115a and phase-shift values from the receive pattern 115b, such that a phase-shift value from one pattern (e.g., transmit pattern 115a) is orthogonally-adjacent (i.e., horizontally-adjacent and vertically-adjacent) to phase-shift values from the other pattern (e.g., receive pattern 115b) and diagonally-adjacent to phase-shift values from the same pattern (e.g., transmit pattern 115a). Thus, the interleaved pattern 115c shown in FIG. 5 is a direct interleaved pattern of the transmit pattern 115a and the receive pattern 115b. As a result, every other antenna element in the array is programmed to reflect microwave radiation towards the target (transmit pattern), and the remaining antenna elements in the array are programmed to reflect microwave radiation towards the microwave receiver (receive pattern).

For example, since the top left corner box in FIG. 5 is a diagonal striped box, the phase-shift value in the top left corner box in FIG. 5 is the phase-shift value in the top left corner box of FIG. 4A (the transmit pattern). Thus, using the values in FIG. 4A, the phase-shift value in the top left corner box in FIG. 5 is "1." Likewise, the box directly below the top left corner box in FIG. 5 is a dotted box, and therefore, the phase-shift value in this box is the phase-shift value in the corresponding box in FIG. 4B. Thus, the phase-shift value in the box directly below the top left corner box in FIG. 5 is "0." In a similar manner, the interleaved pattern 115c shown in FIG. 5 can be completely populated with phase-shift values from FIGS. 4A and 4B, such that each antenna element in the array is programmed with a phase-shift value from either the transmit pattern 111a or the receive pattern 115b in an alternating (interleaved) pattern.

Although the direct interleaved pattern shown in FIG. 5 is a simple and effective pattern for resolving any phase-shift conflicts between the transmit and receive patterns by enabling each antenna element to be programmed with a phase-shift value from only one of the transmit and receive patterns, other interleaved patterns are also possible. In general, embodiments of the present invention include any interleaved pattern that results in programming a first portion of the antenna elements with a transmit phase-shift and a second portion (remainder) of the antenna elements with a receive phase-shift for image capture, in which the first and second portions are substantially equal (i.e., the number of antenna elements programmed with a transmit phase-shift is substantially equal to the number of antenna elements programmed with a receive phase-shift). The interleaved pattern can be a random pattern or a specific pattern designed to optimize one or more parameters of the microwave imaging system.

Figure 6:
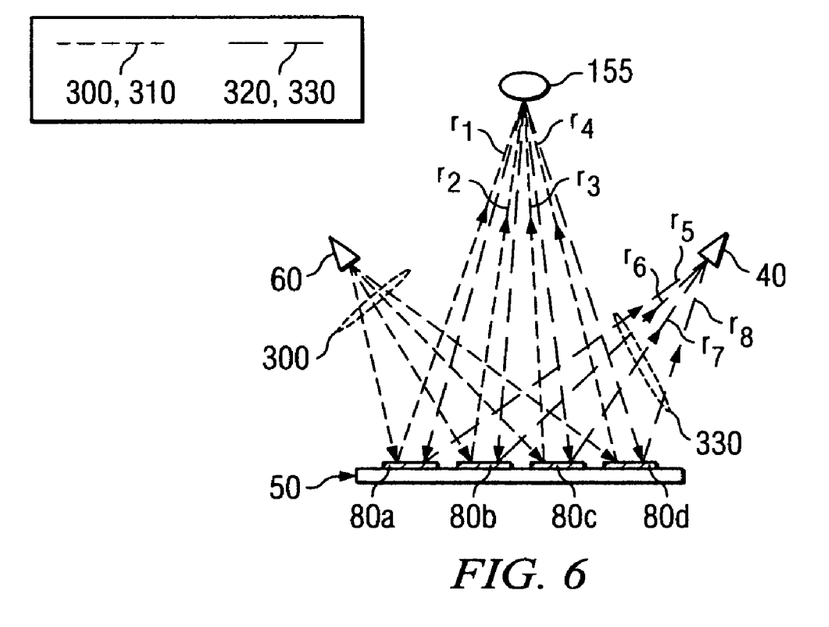
FIG. 6 is a schematic diagram illustrating the reflection of microwave radiation between a microwave source and a microwave receiver using a programmable antenna array in accordance with embodiments of the present invention.

For example, referring now to FIG. 6, there is illustrated exemplary reflected microwave rays between a microwave source and a microwave receiver using a programmable antenna array, in accordance with embodiments of the present invention. In FIG. 6, the source beam 300 of microwave radiation transmitted from a microwave source 60 is received by the antenna elements, only four of which are shown for simplicity, denoted 80a, 80b, 80c and 80d, in the array 50. The antenna elements 80a, 80b, 80c and 80d are each programmed with a respective phase-shift to direct a transmit beam 310 of reflected microwave radiation towards the target 155. The phase shifts are selected to create positive (constructive) interference between all of the microwave rays, denoted $r_1$, $r_2$, $r_3$ and $r_4$, from each of the antenna elements 80a, 80b, 80c and 80d, respectively, at the target 155.

Likewise, as shown in FIG. 6, a reflect beam 320 of microwave radiation reflected from the target 155 and received at the antenna elements 80a, 80b, 80c and 80d in the array 50 can be reflected as a receive beam 330 of reflected microwave radiation towards a microwave receiver 40. Again, the phase-shifts are selected to create positive (constructive) interference between all of the microwave rays, denoted $r_5$, $r_6$, $r_7$ and $r_8$, from each of the antenna elements 80a, 80b, 80c and 80d, respectively, at the microwave receiver 40.

To avoid conflicts between the phase-shift programmed for each individual antenna element 80a, 80b, 80c and 80d for the transmit beam 310 and the phase-shift programmed for each individual antenna element 80a, 80b, 80c and 80d for the receive beam, a portion of the antenna elements 80a, 80b, 80c and 80d can be programmed to contribute only to the transmit beam 310, while the remainder of the antenna elements can be programmed to contribute only to the receive beam 330 in an interleaved pattern.

Figure 7A:
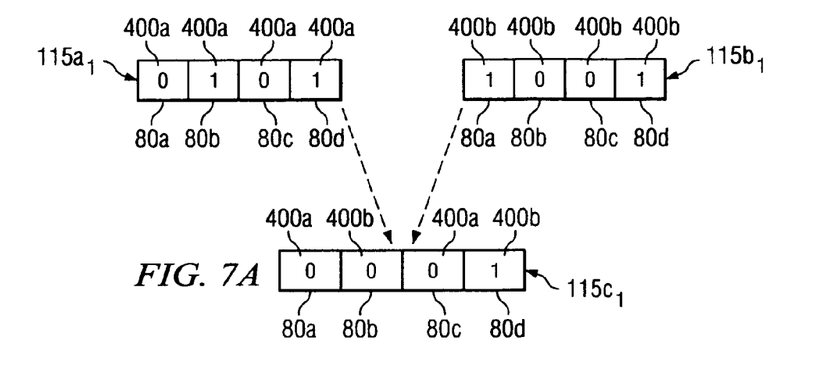
FIGS. 7A-7C illustrate exemplary interleaved patterns including portions of transmit and receive phase-shift patterns for programming a reflector array, in accordance with embodiments of the present invention.
Figure 7B:
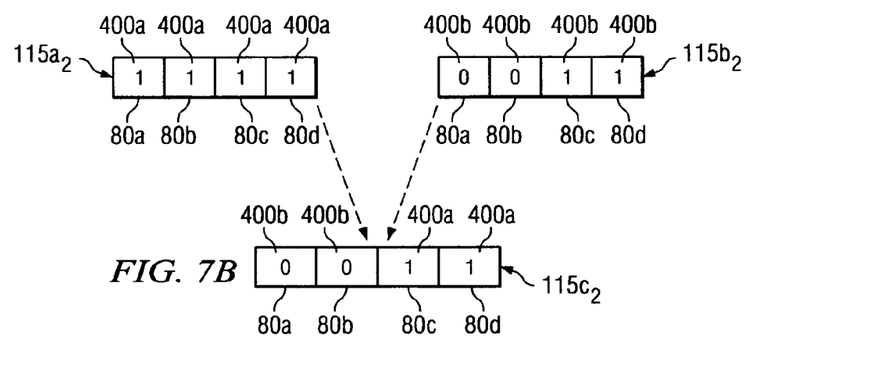
Figure 7C:
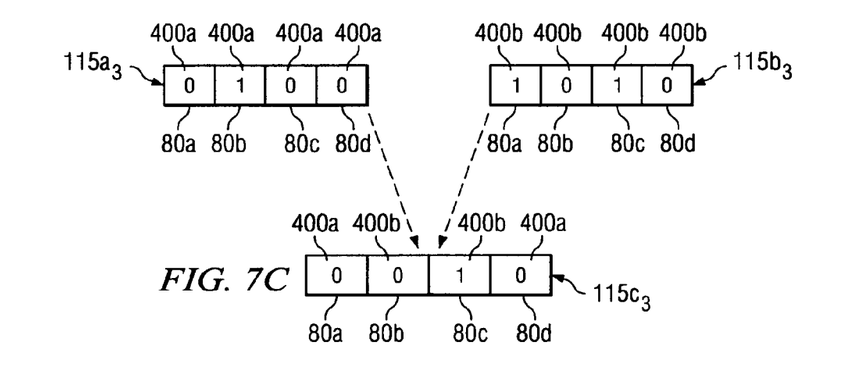

As defined above, the combination of all the phase-shifts assigned to the antenna elements in the array for a particular target forms a pattern. In the case of a binary array, where each antenna element can introduce only one of two phase-shifts, the pattern can be represented as an array of ones and zeros. Examples of binary interleaved patterns for programming the antenna elements 80a, 80b, 80c and 80d of FIG. 6 are shown in FIGS. 7A-7C. FIG. 7A illustrates a first transmit pattern 115a, of transmit phase-shifts 400a for programming antenna elements 80a, 80b, 80c and 80d and a first receive pattern $115b_1$ of receive phase-shifts 400b for programming antenna elements 80a, 80b, 80c and 80d.

For example, antenna element 80a is programmed with a 0 degree phase-shift 400a in the first transmit pattern $115a_1$ and a 180 degree phase-shift 400b in the first receive pattern $115b_1$. In addition, antenna element 80b is programmed with a 180 degree phase-shift 400a in the first transmit pattern $115a_1$ and a 0 degree phase-shift 400b in the first receive pattern $115b_1$. Furthermore, antenna element 80d is programmed with a 180 degree phase-shift 400a in the first transmit pattern $115a_1$ and a 0 degree phase-shift 400b in the first receive pattern $115b_1$. The only antenna element that does not have a phase-shift conflict between the first transmit pattern $115a_1$ and the first receive pattern $115b_1$ is antenna element 80c. Antenna element 80c is programmed with a 0 degree phase-shift 400a and 400b in both the first transmit pattern 115a, and the first receive pattern $115b_1$.

To avoid the phase-shift conflicts between the phase-shifts 400a and 400b in the first transmit pattern $115a_1$ and the first receive pattern $115b_1$, portions of each of the first transmit pattern 115a and the first receive pattern $115b_1$ can be included in a first interleaved pattern $115c_1$. For simplicity, the first interleaved pattern $115c_1$ is a direct interleaved pattern between the first transmit pattern $115a_1$ and the first receive pattern $115b_1$. Thus, as shown in FIG. 7A, in the first interleaved pattern $115c_1$, antenna element 80a is programmed with the transmit phase-shift 400a of 0 degrees, antenna element 80b is programmed with the receive phase-shift 400b of 0 degrees, antenna element 80c is programmed with the transmit phase-shift 400a of 0 degrees and antenna element 80d is programmed with the receive phase-shift 400b of 180 degrees.

Thus, antenna elements 80a and 80c in FIG. 6 are programmed to direct microwave rays $r_1$ and $r_3$, respectively, towards the target, while antenna elements 80b and 80d are programmed to direct microwave rays $r_6$ and $r_8$, respectively, towards the microwave receiver. Antenna elements 80b and 80d in FIG. 6 do not contribute microwave rays $r_2$ and $r_4$, respectively, towards the target, while antenna elements 80a and 80c do not contribute microwave rays $r_5$ and $r_7$, respectively, towards the microwave receiver. Therefore, the transmit beam 310 in FIG. 6 includes only microwave rays $r_1$ and $r_3$ and the receive beam 330 includes only microwave rays $r_6$ and $r_8$. However, it should be understood that since the phase-shifts 400a and 400b for antenna element 80c are the same in the first transmit pattern $115a_1$ and the first receive pattern 115b (i.e., both are 0 degrees), programming antenna element 80c with the phase-shift of 0 degrees will enable antenna element 80c to produce both microwave rays $r_3$ and $r_7$ in the transmit beam 310 and receive beam 330, respectively.

The first interleaved pattern $115c_1$ shown in FIG. 7A is used to capture an image of a first target 155. However, when scanning a person or other object, multiple targets on the person or object are imaged to obtain a complete microwave image of the person or object. Thus, for each target (addressable point in 3D space), a programmer designs a respective transmit pattern and a respective receive pattern. For example, as shown in FIG. 7B, second transmit and receive patterns $115a_2$ and $115b_2$, respectively, are shown for directing microwave beams 310 and 330 to and from a different target. The second transmit pattern $115a_2$ of transmit phase-shifts 400a for programming antenna elements 80a, 80b, 80c and 80d directs a new transmit beam 310 towards the different target, while the second receive pattern $115b_2$ of receive phase-shifts 400b for programming antenna elements 80a, 80b, 80c and 80d reflects a new receive beam 330 from the target towards the microwave receiver.

If the second transmit and receive patterns $115a_2$ and $115b_2$, respectively, were combined in a second direct interleaved pattern (similar to that shown in FIG. 7A), antenna element 80a would be programmed with a 180 degree phase-shift (transmit phase-shift 400a from second transmit pattern $115a_2$), antenna element 80b would be programmed with a 0 degree phase-shift (receive phase-shift 400b from second receive pattern $115b_2$), antenna element 80c would be programmed with a 180 degree phase-shift (transmit phase-shift 400a from second transmit pattern $115a_2$) and antenna element 80d would be programmed with a 180 degree phase-shift (receive phase-shift 400b from second transmit pattern $115b_2$).

Comparing the phase-shifts between the first direct interleaved pattern 115c, and such a second direct interleaved pattern (not specifically shown in FIG. 7B), it can be seen that the phase-shifts programmed for both antenna elements 80a and 80c switch between the first direct interleaved pattern 115c, and such a second direct interleaved pattern. Thus, the phase-shift programmed for antenna element 80a in the first direct interleaved pattern is 0 degrees, while the phase-shift programmed for antenna element 80a in the second direct interleaved pattern would be 180 degrees, and likewise for antenna element 80c.

As the number of phase changes between a pair of patterns used in scanning a person or other object increases, the sidelobe area around the main lobe at the target may also increase. In addition, the more phase changes between successive microwave images, the more power is necessary for the digital circuitry that drives the antenna elements in the array. Therefore, in accordance with embodiments of the present invention, minimizing the number of phase changes between successive microwave images can be achieved by selecting portions of the transmit and receive patterns for the interleaved pattern that result in the fewest changes between interleaved patterns (e.g., interleaved patterns $115c_1$ and $115c_2$).

As can be seen in FIG. 7B, in the second interleaved pattern $115c_2$, antenna element 80a is programmed with the receive phase-shift 400b of 0 degrees, antenna element 80b is programmed with the receive phase-shift 400b of 0 degrees, antenna element 80c is programmed with the transmit phase-shift 400a of 180 degrees and antenna element 80d is programmed with the transmit phase-shift 400a of 180 degrees. Thus, antenna elements 80a and 80b in FIG. 6 are programmed to direct microwave rays $r_5$ and $r_6$, respectively, towards the microwave receiver, while antenna elements 80c and 80d are programmed to direct microwave rays $r_3$ and $r_4$, respectively, towards the target.

Comparing the phase-shifts between the first interleaved pattern $115c_1$ shown in FIG. 7A and the second interleaved pattern $115c_2$ shown in FIG. 7B, it can be seen that the phase-shift programmed for only antenna element 80c changes between the first interleaved pattern 115c, and the second interleaved pattern $115c_2$. As a result, the total number of phase-shift changes using interleaved patterns $115c_1$ and $115c_2$ is only one, whereas the total number of phase-shift changes using two direct interleaved patterns would be two. Designing each interleaved pattern to minimize the number of phase shift changes between successive microwave images can reduce the area of sidelobes around the main lobe at the target and reduces the power necessary for driving the digital circuitry controlling the antenna elements while scanning the person or other object.

Likewise, in FIG. 7C, the interleaved pattern $115c_3$ is designed to minimize the number of phase-shift changes between interleaved patterns $115c_2$ and $115c_3$. Therefore, in the second interleaved pattern $115c_3$, antenna element 80a is programmed with the transmit phase-shift 400a of 0 degrees (shown in the third transmit pattern $115a_3$), antenna element 80b is programmed with the receive phase-shift 400b of 0 degrees (shown in the third receive pattern $115b_3$), antenna element 80c is programmed with the receive phase-shift 400b of 180 degrees (shown in the third receive pattern $115b_3$) and antenna element 80d is programmed with the transmit phase-shift 400a of 0 degrees (shown in the third transmit pattern $115a_3$). Thus, antenna elements 80a and 80d in FIG. 6 are programmed to direct microwave rays $r_1$ and $r_4$, respectively, towards the target, while antenna elements 80b and 80c are programmed to direct microwave rays $r_6$ and $r_7$, respectively, towards the microwave receiver. The total number of phase-shift changes using interleaved patterns $115c_2$ and $115c_3$ is again only one (i.e., the phase-shift of antenna element 80d changes), which is the minimum number of phase-shift changes possible using the third transmit and receive patterns $115a_3$ and $115b_3$, respectively.

Figure 8A:
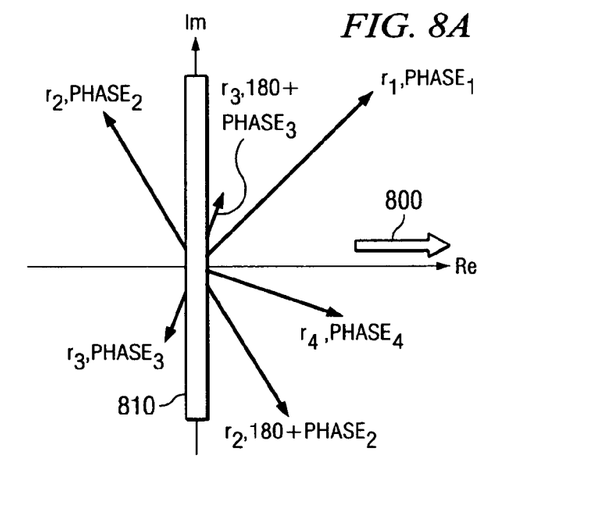
FIGS. 8A and 8B are phasor representations of microwave rays and phase-shifted microwave rays.

In another embodiment, the parameter to be optimized is the amplitudes of the transmit beam 310 and the receive beam 330. Referring now to FIG. 8A, each microwave ray ($r_1$, $r_2$, $r_3$ and $r_4$) in the transmit beam 310 shown in FIG. 6 can be represented as a phasor and described with a particular magnitude and phase. For example, microwave ray $r_1$ can be described as $r_1 * e^{(j*phase1)}$, and represented as a phasor in a two-dimensional complex plane including real (Re) and imaginary (Im) components. In FIG. 8A, microwave rays $r_1$, $r_2$, $r_3$ and $r_4$ are represented as a phasors $r_1$,phase$_1$, $r_2$,phase$_2$, $r_3$,phase$_3$ and $r_4$,phase$_4$ all of the phasors $r_1$,phase$_1$, $r_2$,phase$_2$, $r_3$,phase$_3$ and $r_4$,phase$_4$ determines the amplitude beam of microwave radiation at the target. To maximize the amplitude at the target, the microwave rays $r_1$, $r_2$, $r_3$ and $r_4$ from each of the antenna elements have the same phase. For a continuously phased array, each antenna element can be programmed with a continuously-variable phase-shift to align all of the microwave rays with the same phase.

However, in a quantized array in which each antenna element can be programmed with only one of a particular number of quantized phase-shifts, the phases of the microwave rays may only be able to be partially aligned. For example, in a binary array, each antenna element can be programmed with one of two different binary states (e.g., 0 degree phase-shift or 180 degree phase-shift). Therefore, the phase-shifts of each antenna element are programmed merely to maximize constructive interference and minimize (or prevent) destructive interference at the target. To prevent destructive interference at the target, an ideal phase (shown in FIG. 8A along line 800) is selected, and all antenna elements are programmed with a particular quantized phase-shift to produce respective microwave rays that collectively form a beam of microwave radiation at the ideal phase 800 (e.g., the sum of all the microwave rays at the target is a phasor at the ideal phase 800).

As can be seen in FIG. 8A, once the ideal phase 800 is selected, a quantization line 810 orthogonal to the ideal phase 800 can be used to determine the phase-shift applied to each individual microwave ray to enable all microwave rays to sum up to the ideal phase 800. In FIG. 8A, microwave rays $r_1$ and $r_4$ are on the same side of the quantization line 810 as the ideal phase 800. Therefore, a binary phase-shift of 0 degrees is applied to microwave rays $r_1$ and $r_4$ to maintain the current phase of each of these rays. However, microwave rays $r_2$ and $r_3$ are on the opposite side of the quantization line 810 than the ideal phase 800. As a result, a binary phase-shift of 180 degrees is applied to microwave rays $r_2$ and $r_3$ to switch the phase of these microwave rays to the same side of the quantization line as the ideal phase 800. The sum of the microwave rays $r_1$, $r_2$, $r_3$ and $r_4$ is a transmit beam 310 of microwave radiation at the ideal phase 800. However, since the phases of each of the microwave rays are not perfectly aligned, the amplitude of the beam of microwave radiation at the target may be less than that achievable with a continuously variable phased array.

Figure 8B:
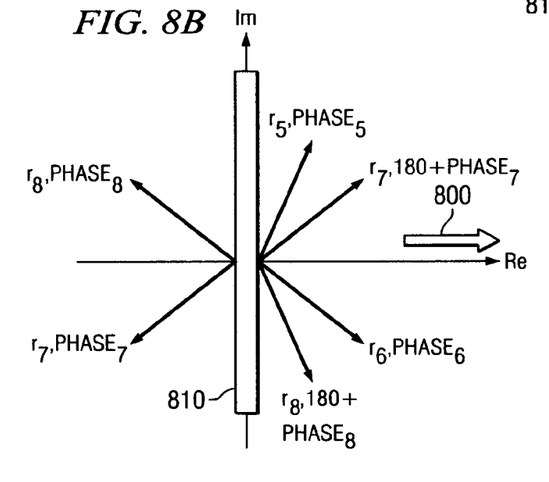

Likewise, as can be seen in FIG. 8B, each microwave ray ($r_5$, $r_6$, $r_7$ and $r_8$) in the receive beam 330 shown in FIG. 6 can be represented as a phasor and described with a particular magnitude and phase. In FIG. 8B, microwave rays $r_5$ and $r_6$ are on the same side of the quantization line 810 as the ideal phase 800. Therefore, a binary phase-shift of 0 degrees is applied to microwave rays $r_5$ and $r_6$ to maintain the current phase of each of these rays. However, microwave rays $r_7$ and $r_8$ are on the opposite side of the quantization line 810 than the ideal phase 800. As a result, a binary phase-shift of 180 degrees is applied to microwave rays $r_7$ and $r_8$ to switch the phase of these microwave rays to the same side of the quantization line as the ideal phase 800. The sum of the microwave rays $r_5$, $r_6$, $r_7$ and $r_8$ is a receive beam 330 of microwave radiation at the ideal phase 800.

Referring again to FIG. 8A, microwave rays $r_2$ and $r_3$ have a higher phase offset from the ideal phase 800 than microwave rays $r_1$ and $r_4$. Thus, microwave rays $r_1$ and $r_4$ contribute the most to the amplitude of the microwave radiation at the target (since these microwave rays are closest to the ideal phase 800 and farthest from the quantization line 810), and microwave rays $r_2$ and $r_3$ contribute the least to the amplitude of the microwave radiation at the target (since these microwave rays are closest to the quantization line 810).

Likewise, in FIG. 8B, microwave rays $r_5$ and $r_8$ have a higher phase offset from the ideal phase 800 than microwave rays $r_6$ and $r_7$. Thus, microwave rays $r_6$ and $r_7$ contribute the most to the amplitude of the microwave radiation at the microwave receiver (since these microwave rays are closest to the ideal phase 800 and farthest from the quantization line 810), and microwave rays $r_5$ and $r_8$ contribute the least to the amplitude of the microwave radiation at the microwave receiver (since these microwave rays are closest to the quantization line 810).

To design an interleaved pattern of transmit and receive patterns for an array that results in the maximum amplitude of the transmit beam and the receive beam, the phase-shifts selected from the transmit pattern and the receive pattern can be those phase-shifts that produce microwave rays closest to the ideal phase 800 and farthest from the quantization line 810.

Figure 9:
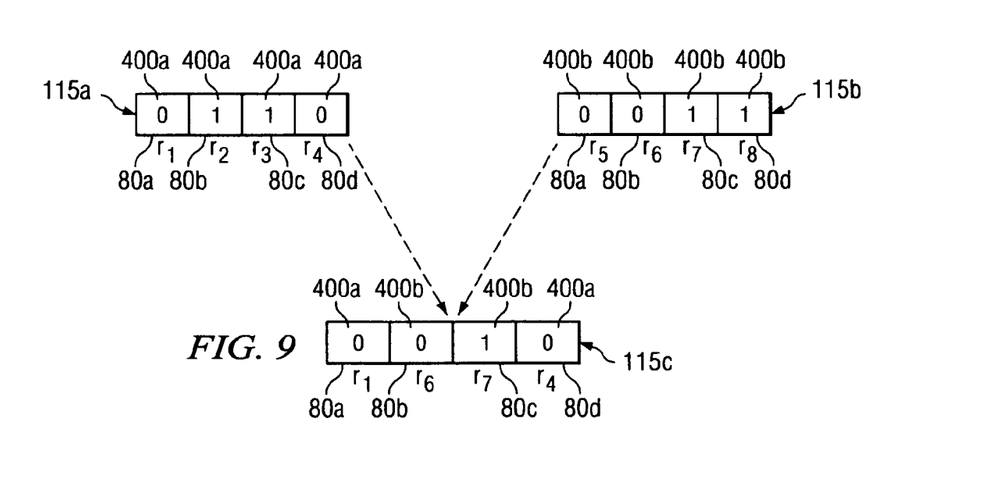
FIG. 9 illustrates another exemplary interleaved pattern including portions of transmit and receive phase-shift patterns for programming a reflector array, in accordance with embodiments of the present invention.

Exemplary binary phase-shift patterns 115a and 115b for the portion of the array containing the antenna elements 80a, 80b, 80c and 80d producing the microwave rays $r_1$, $r_2$, $r_3$ and $r_4$ shown in FIGS. 6, 8A and 8B are shown in FIG. 9. The transmit pattern 115a includes transmit phase-shifts 400a for programming antenna elements 80a, 80b, 80c and 80d to produce microwave rays $r_1$, $r_2$, $r_3$ and $r_4$ forming the transmit beam 310, and the receive pattern 115b includes receive phase-shifts 400b for programming antenna elements 80a, 80b, 80c and 80d to produce microwave rays $r_5$, $r_6$, $r_7$ and $r_8$ forming the receive beam 330.

The transmit pattern 115a and receive pattern 115b correspond to the phase-shifts shown in FIGS. 8A and 8B. Therefore, antenna element 80a is programmed with a 0 degree phase-shift 400a in the transmit pattern 115a and a 0 degree phase-shift 400b in the receive pattern 115b, antenna element 80b is programmed with a 180 degree phase-shift 400a in the transmit pattern 115a and a 0 degree phase-shift 400b in the receive pattern 115b, antenna element 80c is programmed with a 180 degree phase-shift 400a in the transmit pattern 115a and a 180 degree phase-shift 400b in the receive pattern 115b and antenna element 80d is programmed with a 0 degree phase-shift 400a in the transmit pattern 115a and a 180 degree phase-shift 400b in the receive pattern 115b.

To maximize the amplitude of the transmit beam 310 and receive beam 330 in FIG. 6, the interleaved pattern 115c is designed to include the transmit phase-shifts 400a for antenna elements 80a and 80d, which produce microwave rays $r_1$ and $r_4$. As discussed above, microwave rays $r_1$ and $r_4$ contribute the most to the amplitude of the microwave radiation at the target (since these microwave rays are closest to the ideal phase 800 and farthest from the quantization line 810). Therefore, designing the interleaved pattern 115c to include the transmit phase-shifts for antenna elements 80a and 80d to produce microwave rays $r_1$ and $r_4$ maximizes the amplitude of the transmit beam 310.

In addition, the amplitude of the receive beam 330 is also maximized by including in the interleaved pattern 115c the receive phase-shifts 400b for antenna elements 80b and 80c, which produce microwave rays $r_6$ and $r_7$. As discussed above, microwave rays $r_6$ and $r_7$ contribute the most to the amplitude of the microwave radiation at the microwave receiver (since these microwave rays are closest to the ideal phase 800 and farthest from the quantization line 810). Therefore, designing the interleaved pattern 115c to include the receive phase-shifts for antenna elements 80b and 80c to produce microwave rays $r_6$ and $r_7$ maximizes the amplitude of the receive beam 330. It should be understood that in this embodiment, the selection of transmit or receive phase-shifts in the interleaved pattern is done to maximize the amplitudes of the transmit and receive beams, and not necessarily to produce the maximum amplitudes. Depending on the phase-shifts in the transmit and receive patterns, it may not be possible to produce the absolute maximum amplitude for both the transmit beam and the receive beam.

In a further embodiment, the parameter to be optimized can be a ratio of constructive interference of the microwave radiation at the target and destructive interference of the microwave radiation at a microwave receiver. Background noise resulting from stray radiation from the microwave source to the microwave receiver reduces the signal-to-noise ratio (SNR) of the microwave imaging system. Increasing the destructive interference of the stray radiation at the receiver increases the SNR. Therefore, in accordance with embodiments of the present invention, the phase-shifts programmed for each antenna element in the interleaved pattern can be designed so as to maximize the destructive interference at the receiver, while maintaining sufficient constructive interference at the target.

Figure 10:
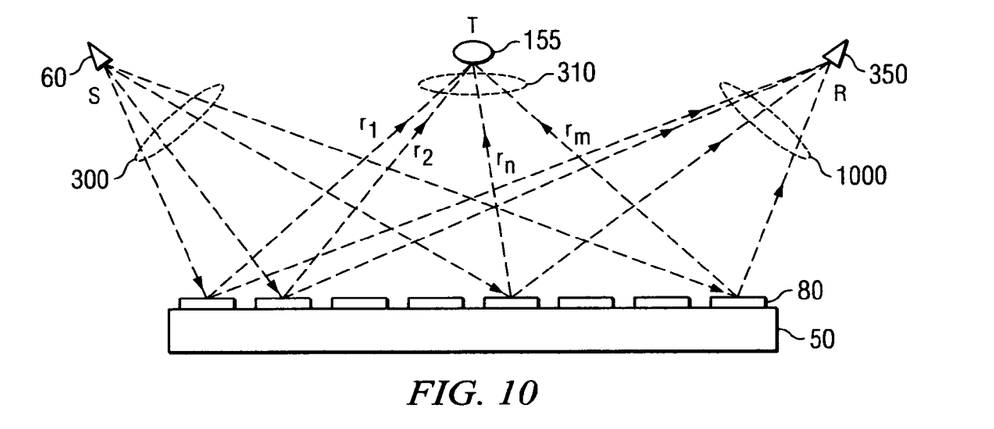
FIG. 10 is a schematic diagram illustrating leakage microwave radiation between a microwave source and a microwave receiver.

Referring now to FIG. 10, there is illustrated leakage (stray) microwave radiation between a microwave source 60 and a microwave receiver 40. As in FIG. 6, in FIG. 10, a beam of microwave radiation 300 transmitted from the microwave source (antenna) 60 is received by various antenna elements 80 in the array 50. The antenna elements 80 are each programmed with a respective phase-shift to direct a beam of reflected microwave radiation 310 towards a target 155. The phase-shifts are selected to create positive (constructive) interference between all of the microwave rays, denoted $r_1$, $r_2$, $r_3$ and $r_4$, within the beam of reflected microwave radiation 310 at the target 155. However, some of the microwave radiation from the source 60 is reflected off of the array 50 in a beam of stray microwave radiation 1000 towards the microwave receiver 40. To minimize the effect of the stray microwave radiation 1000 at the receiver 40 (i.e., increase the SNR), the destructive interference at the microwave receiver can be increased without a proportional decrease in the constructive interference at the target.

Referring again to FIG. 8A, as discussed above microwave rays $r_2$ and $r_3$ have a higher phase offset from the ideal phase 800 than microwave rays $r_1$ and $r_4$. Thus, microwave rays $r_1$ and $r_4$ contribute the most to the amplitude of the microwave radiation at the target (since these microwave rays are closest to the ideal phase 800 and farthest from the quantization line 810), and microwave rays $r_2$ and $r_3$ contribute the least to the amplitude of the microwave radiation at the target (since these microwave rays are closest to the quantization line 810).

Likewise, in FIG. 8B, microwave rays $r_5$ and $r_8$ have a higher phase offset from the ideal phase 800 than microwave rays $r_6$ and $r_7$. Thus, microwave rays $r_6$ and $r_7$ contribute the most to the amplitude of the microwave radiation at the microwave receiver (since these microwave rays are closest to the ideal phase 800 and farthest from the quantization line 810), and microwave rays $r_5$ and $r_8$ contribute the least to the amplitude of the microwave radiation at the microwave receiver (since these microwave rays are closest to the quantization line 810).

Therefore, selecting the receive phase-shifts of the antenna elements whose transmit phase-shifts produce microwave rays with the highest phase offset from the ideal phase 800 (i.e., microwave rays $r_2$ and $r_3$) for inclusion in the interleaved pattern can enhance the destructive interference at the receiver without producing a significant change in the constructive interference at the target. For example, referring again to FIG. 9, the interleaved pattern 115c can be designed to include the receive phase-shifts 400b of antenna elements 80b and 80c, which would produce microwave rays $r_2$ and $r_3$ with the highest phase offset from the ideal phase 800. Thus, the interleaved pattern 115c can be designed to include the transmit phase-shifts 400a of antenna elements 80a and 80d and the receive phase-shifts 400b of antenna elements 80b and 80c to increase the destructive interference at the microwave receiver without proportionally decreasing the constructive interference at the target. It should be understood that in other embodiments, the same principles can be applied to minimize the area of the sidelobes by increasing the destructive interference in the sidelobes at the target, while still maintaining sufficient constructive interference in the main lobe at the target.

In operation, the process of selecting which antenna elements to associate with which pattern (transmit or receive) may be performed iteratively by producing a directly interleaved pattern and then changing the phase one-at-a-time of each antenna element that does not significantly contribute to the amplitude of the microwave radiation at the target. With each change, the resulting radiation pattern at the microwave receiver is computed. If the change in phase-shift for one antenna element reduces the destructive interference at the microwave receiver, the interleaved pattern is adjusted to include this phase-shift change. However, if the phase-shift change does not reduce the destructive interference at the microwave receiver, the interleaved pattern remains the same (i.e., the phase-shift of that antenna element is not altered).

Another parameter that can be optimized in accordance with embodiments of the present invention is a metric associated with compression of the pattern. If the pattern can be divided into neighborhoods of elements, each with an entropy less than the total number of elements in the neighborhood, the pattern can be compressed to reduce the amount of memory space needed to store the pattern and increase the handling speed of the pattern data.

Figure 11A:
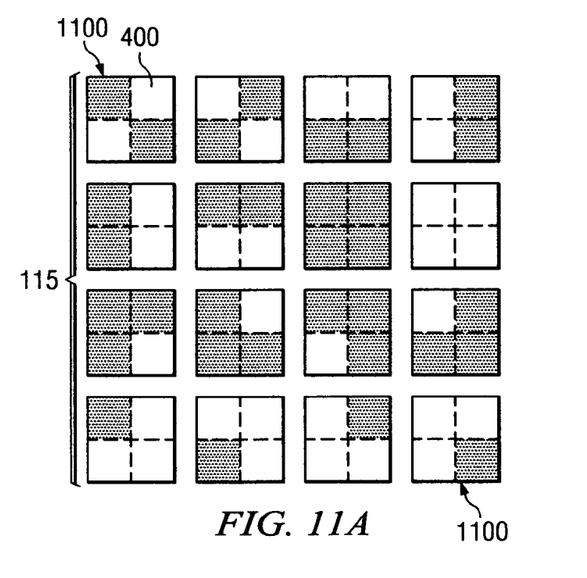
FIGS. 11A and 11B illustrate exemplary compressible portions of phase shift patterns.
Figure 11B:
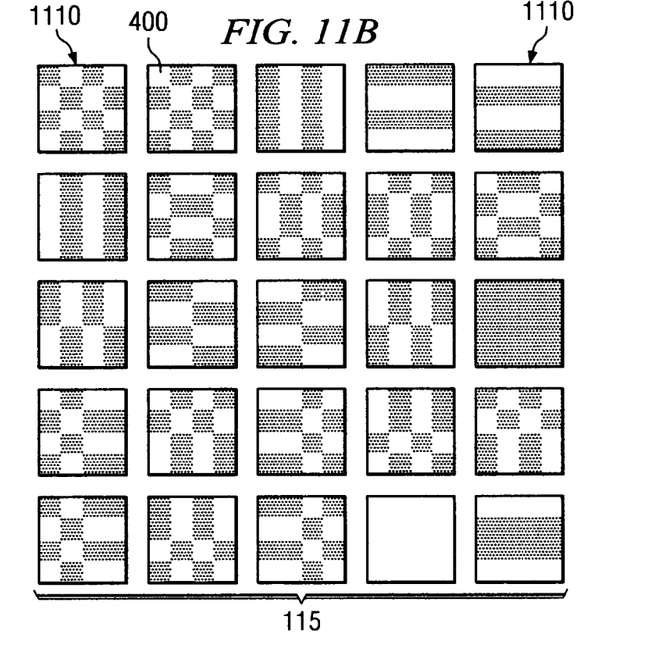

For example, as shown in FIG. 11A, various neighborhoods 1100 of square 2×2 elements 400 are shown. Each neighborhood 1100 has an entropy of 3, which means that three bits are needed to describe the four elements 400. As another example, as shown in FIG. 11B, various neighborhoods 1110 of square 4×4 elements 100 are shown. Each neighborhood 1110 has an entropy of 10, which means that ten bits are needed to describe the sixteen elements 400. To decrease the entropy of a neighborhood 1100 or 1110, and thus increase the compression, the number of possible neighborhoods 1100 or 1110 or a particular size block of elements 400 must be reduced. In both FIGS. 11A and 11B, the neighborhoods are shown from most frequently used at the top left to the least frequently used at the bottom right. If the least frequently used neighborhoods can be removed as possibilities, the number of bits needed to describe the elements 400 in a neighborhood 1100 or 1110 decreases (entropy decreases). This will lead to "lossy compression" with a higher compression ratio, but also higher distortion than "lossless compression."

For example, if all of the neighborhoods 1100 on the bottom row in FIG. 11A are removed as possibilities, the phase shift of one or more elements 400 in an interleaved pattern that contains one or more of the removed neighborhoods must be changed. Referring again to FIGS. 4A and 4B, if the transmit pattern 115a is directly interleaved with the receive pattern 115b, as shown in FIG. 5, the bottom left 2×2 square block of elements 400 resembles one of the bottom neighborhoods 1100 in FIG. 11A, specifically, the second from the right on the bottom. Thus, to reduce the entropy and increase the compression of the pattern 115, the phase shift of at least one of the elements 400 in the bottom left 2×2 square block of elements 400 in FIG. 5 must be changed so the block of elements 400 resembles one of the remaining possible neighborhoods 1100 in FIG. 11A.

It should be understood that other compression metrics can be used in lieu of or in addition to the metrics described above. For example, to determine which individual antenna elements or blocks of antenna elements should be altered, the contribution that each antenna element or block of antenna elements makes to the amplitude of the microwave radiation at the target can be used as a weighting metric for lossy compression.

Figure 12:
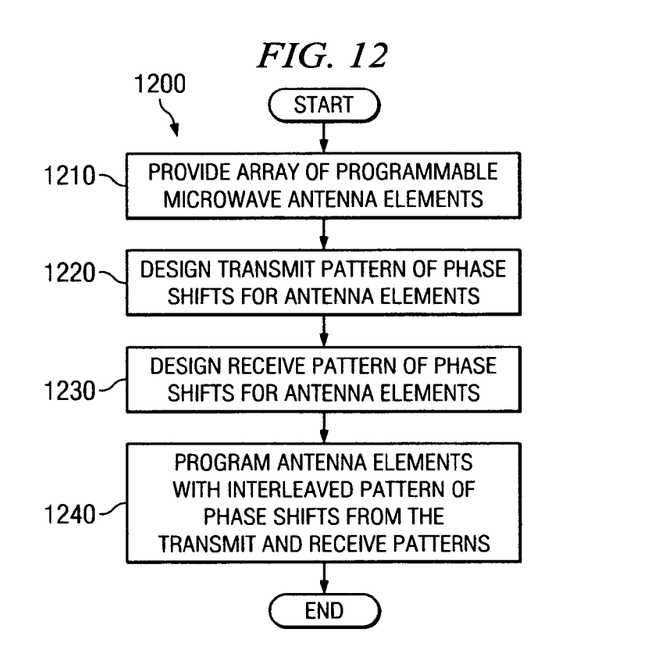
FIG. 12 is a flow chart illustrating an exemplary process for capturing a microwave image of a target using an interleaved transmit/receive phase-shift pattern, in accordance with embodiments of the present invention.

FIG. 12 is a flow chart illustrating an exemplary process 1200 for capturing a microwave image of a target using an interleaved transmit/receive phase-shift pattern, in accordance with embodiments of the present invention. Initially, an array of programmable microwave antenna elements is provided at block 1210. At block 1220, a transmit pattern of phase-shifts is designed for the array, such that each of the antenna elements in the array is assigned a respective phase-shift to direct a beam of microwave radiation towards a target. At block 1230, a receive pattern of phase-shifts is designed for the array, such that each of the antenna elements in the array is assigned a respective phase-shift to direct a beam of microwave radiation reflected from the target towards a microwave receiver. At block 1240, the antenna elements are programmed with respective phase-shifts in an interleaved pattern including a portion of the designed transmit pattern and a portion of the designed receive pattern. The interleaved pattern can be a direct interleaved pattern of the transmit and receive patterns, a random interleaved pattern or a specific interleaved pattern designed to optimize one or more parameters of the microwave imaging system.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A reflector array for use in a microwave imaging system to capture a microwave image of an object, comprising:
a plurality of reflecting antenna elements capable of being programmed with respective phase-shifts in a first pattern to direct a first beam of microwave radiation towards a first target, and capable of being programmed with respective phase-shifts in a second pattern to direct a second beam of microwave radiation towards a second target;
wherein said plurality of antenna elements are programmed with respective phase-shifts in an interleaved pattern including a portion of said first pattern and a portion of said second pattern to capture said microwave image of said object, wherein each of said plurality of antenna elements are quantized phase-shifted antenna elements, and wherein said phase-shifts of each of said plurality of antenna elements for said first pattern and said second pattern are selected based on an ideal phase, and wherein said portion of said first pattern and said portion of said second pattern in said interleaved pattern are each selected to minimize a quantization error based on a phase offset from said ideal phase for each of said plurality of antenna elements.

2. The array of claim 1, wherein said interleaved pattern is a direct interleaved pattern of said first pattern and said second pattern.

3. The array of claim 1, wherein said first target is associated with said object being imaged.

4. The array of claim 1, wherein said first target is a target associated with said object being imaged and said second target is a microwave receiver, and wherein said first pattern is a transmit pattern for directing said first beam of microwave radiation towards said target as a transmit beam and said second pattern is a receive pattern for reflecting said second beam of microwave radiation reflected from said target object towards said microwave receiver as a receive beam, said microwave image being a microwave image of said target.

5. The array of claim 1, wherein said quantized phase-shifted antenna elements are binary phase-shifted antenna elements.

6. A microwave imaging system for capturing a microwave image of a target, comprising:
   a microwave source for providing microwave radiation;
   a microwave receiver for receiving microwave radiation; and
   a reflector antenna array including a plurality of antenna elements, each of said antenna elements being capable of being programmed with respective phase-shifts in a transmit pattern to direct a beam of microwave radiation from said microwave source towards said target, and each being capable of being programmed with respective phase-shifts in a receive pattern to reflect a reflected beam of microwave radiation reflected from said target towards said microwave receiver;
   wherein said plurality of antenna elements are programmed with respective phase-shifts in an interleaved pattern including a portion of said transmit pattern and a portion of said receive pattern to capture said microwave image of said target, wherein each of said plurality of antenna elements are quantized phase-shifted antenna elements, and wherein said phase-shifts of each of said plurality of antenna elements for said transmit pattern and said receive pattern are selected based on an ideal phase, and wherein said portion of said transmit pattern and said portion of said receive pattern in said interleaved pattern are each selected to minimize a quantization error based on a phase offset from said ideal phase for each of said plurality of antenna elements.

7. The system of claim 6, wherein said interleaved pattern is a direct interleaved pattern of said transmit pattern and said receive pattern.

8. A method for configuring an array of reflecting antenna elements to capture a microwave image of a target, comprising:
   providing an array including a plurality of reflecting antenna elements:
   designing a transmit pattern of respective phase-shifts for each of the reflecting antenna elements to direct a beam of microwave radiation from a microwave source towards the target;
   designing a receive pattern of respective phase-shifts for each of the reflecting antenna elements to reflect a reflected beam of microwave radiation reflected from the target towards a microwave receiver; and
   programming each of the microwave antenna elements with a respective phase-shift in an interleaved pattern including a portion of the transmit pattern and a portion of the receive pattern, wherein said designing the transmit pattern and said designing the receive pattern includes selecting the phase-shifts of each of the plurality of antenna elements for the transmit pattern and the receive pattern based on an ideal phase, and wherein each of the reflecting antenna elements are quantized phase-shifted antenna elements, and wherein said programming further includes selecting the portion of the transmit pattern and the portion of the receive pattern in the interleaved pattern to minimize a quantization error based on a phase offset from the ideal phase for each of the plurality of antenna elements.

9. The method of claim 8, wherein said interleaved pattern is a direct interleaved pattern of said transmit pattern and said receive pattern.

* * * * *